US012639580B2

(12) United States Patent　　　　(10) Patent No.:　US 12,639,580 B2

Sada　　　　　　　　　　　　　　　　(45) Date of Patent:　May 26, 2026

(54) FORWARD PROPAGATION APPARATUS, LEARNING APPARATUS, INFORMATION PROCESSING SYSTEM, PROCESSING METHOD, AND NON-TRANSITORY COMPUTER READABLE MEDIUM STORING PROGRAM

(71) Applicant: NEC Corporation, Tokyo (JP)

(72) Inventor: Youki Sada, Tokyo (JP)

(73) Assignee: NEC CORPORATION, Tokyo (JP)

( * ) Notice:　Subject to any disclaimer, the term of this patent is extended or adjusted under 35 U.S.C. 154(b) by 108 days.

(21) Appl. No.:　18/681,755

(22) PCT Filed:　Aug. 25, 2021

(86) PCT No.:　PCT/JP2021/031184

§ 371 (c)(1),
(2) Date:　Feb. 6, 2024

(87) PCT Pub. No.: WO2023/026404

PCT Pub. Date: Mar. 2, 2023

(65) Prior Publication Data

US 2025/0139441 A1　　May 1, 2025

(51) Int. Cl.
G06N 3/084　　　(2023.01)
G06T 5/20　　　(2006.01)
(Continued)

(52) U.S. Cl.
CPC ............... G06N 3/084 (2013.01); G06T 5/20 (2013.01); G06T 7/73 (2017.01); G06V 10/771 (2022.01);
(Continued)

(58) Field of Classification Search
CPC ........ G06N 3/084; G06N 3/045; G06N 3/048; G06N 3/08; G06T 5/20; G06T 7/73;
(Continued)

(56) References Cited

U.S. PATENT DOCUMENTS 10,410,352 B1 * 9/2019 Kim ...................... G06F 18/214
12,079,718 B2 * 9/2024 Ida ........................... G06N 3/08
(Continued)

FOREIGN PATENT DOCUMENTS

JP　　　2020-194446 A　　12/2020
WO　　2021/079441 A1　　4/2021

OTHER PUBLICATIONS

JP Office Action for JP Application No. 2023-543556, mailed on Dec. 17, 2024 with English Translation.
(Continued)

*Primary Examiner* — Garcia Ade
(74) *Attorney, Agent, or Firm* — Sughrue Mion, PLLC

(57)　　　　　ABSTRACT

A forward propagation apparatus is a forward propagation apparatus for a neural network, including: a mask generation unit that generates a binary mask; and a layer execution unit that performs an operation for a sparse convolutional layer according to a value at each coordinate of the binary mask, in which the mask generation unit: generates heat maps by performing an operation for a convolutional layer on an input feature map; generates a composite heat map obtained by combining the heat maps, into one heat map by summing up values of heat maps on a coordinate-by-coordinate basis; and generates the binary mask by binarizing a value at each coordinate of the composite heat map by using a predetermined threshold.

8 Claims, 12 Drawing Sheets

(51) Int. Cl.
*G06T 7/73* (2017.01)
*G06V 10/771* (2022.01)

(52) U.S. Cl.
CPC ............... *G06T 2207/30196* (2013.01); *G06V 2201/07* (2022.01)

(58) Field of Classification Search
CPC ........ G06T 2207/30196; G06V 10/771; G06V 2201/07; G06V 10/764; G06V 10/82; G06V 40/103
See application file for complete search history.

(56) References Cited

U.S. PATENT DOCUMENTS

| | | |
|---|---|---|
| 2019/0205740 A1 | 7/2019 | Judd et al. |
| 2020/0012608 A1 | 1/2020 | Woo et al. |
| 2020/0082254 A1 | 3/2020 | Dally et al. |
| 2022/0215228 A1 | 7/2022 | Yokota |

OTHER PUBLICATIONS

International Search Report for PCT Application No. PCT/JP2021/031184, mailed on Nov. 16, 2021.
Mengye Ren et al., "SBNet: Sparse Blocks Network for Fast Inference", Computer Vision and Pattern Recognition Conference (CVPR) 2018, pp. 8711-8720.
Thomas Verelst et al., "Dynamic Convolutions: Exploiting Spatial Sparsity for Faster Inference", CVPR 2020, pp. 2320-2329.

* cited by examiner

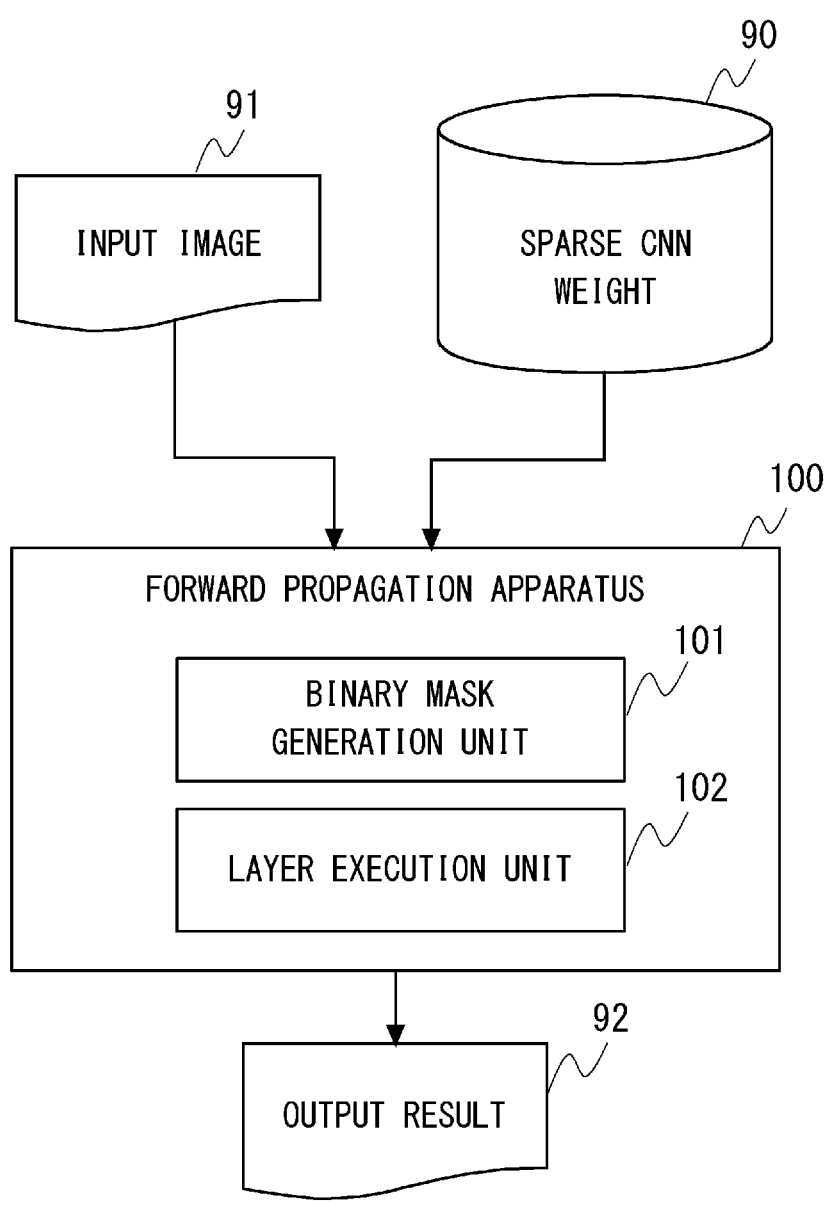
F i g.  1

INPUT FEATURE MAP X $C_{in}$

H

W

WEIGHT F

BIAS B

BINARY MASK M

SpConv KxK $C_{out}$

H

W

BINARY MASK M

■ :1 (CALCULATION IS CARRIED OUT)

☒ :0 (CALCULATION IS OMITTED)

OUTPUT FEATURE MAP Z 100, 200

FORWARD PROPAGATION APPARATUS, LEARNING APPARATUS, INFORMATION PROCESSING SYSTEM, PROCESSING METHOD, AND NON-TRANSITORY COMPUTER READABLE MEDIUM STORING PROGRAM

This application is a National Stage Entry of PCT/JP2021/031184 filed on Aug. 25, 2021, the contents of all of which are incorporated herein by reference, in their entirety.

TECHNICAL FIELD

The present disclosure relates to a forward propagation apparatus, a learning apparatus, an information processing system, a processing method, and a non-transitory computer readable medium storing a program.

BACKGROUND ART

Technologies for moving-image recognition and natural language processing by deep neural networks (DNNs: Deep Neural Networks) have been actively developed. In particular, a convolutional neural network (CNN: Convolutional Neural Network), which is a type of DNN, has achieved high recognition accuracy in the field of image recognition. Examples of the above-mentioned field of image recognition include object recognition for estimating the type and coordinate position of an object, semantic segmentation for estimating the type of an object on a pixel-by-pixel basis in an image, and human pose estimation for estimating the coordinates of joint points of a human being.

By training a CNN in a large-scale server with a large amount of learning data, the CNN can achieve high recognition. Meanwhile, in an inference using CNNs, processing needs be performed in real time under a power-limited environment such as by an edge device or a mobile terminal. A CNN is mainly composed of convolutional layers. In the convolutional layer, a number of product-sum operations need to be repeated.

Various researches have been carried out in order to process a CNN, which requires a large number of product-sum operations, at a high speed. For example, Non-patent Literature 1 proposes to speed up 3D (three-dimensional) object detection by using two CNNs. This literature proposes a technique in which a mask indicating an image area around an object is inferred by a semantic segmentation CNN, which is the first CNN, and convolution operations are performed only in the image area around the object by an object detection CNN, which is the second CNN. This method has achieved an operation speed 2.7 times faster than that of an ordinary object detection apparatus, which performs product-sum operations the same number of times in every one of the pixels, though the recognition accuracy has deteriorated by about 1% compared to the ordinary object detection apparatus. Further, Non-patent Literature 2 proposes a mask unit that infers an image area around an object in every two or three layers. In the evaluation of the pose estimation, this technology has achieved an operation speed 1.6 times faster than when this technology is not used without deteriorating the recognition accuracy. Further, each of Patent Literatures 1 to 3 proposes a convolution hardware circuit in which the number of product-sum operations is reduced by omitting (i.e., by not performing) product-sum operations when a pixel value in an input feature map is zero.

CITATION LIST

Non Patent Literature

Non-patent Literature 1: Mengye Ren et al., "SBNet: Sparse Blocks Network for Fast Inference", Computer Vision and Pattern Recognition Conference (CVPR) 2018.
Non-patent Literature 2: Thomas Verelst et al., "Dynamic Convolutions: Exploiting Spatial Sparsity for Faster Inference", CVPR 2020.

Patent Literature

Patent Literature 1: United States Patent Application Publication No. 2019/0205740
Patent Literature 2: United States Patent Application Publication No. 2020/0082254
Patent Literature 3: United States Patent Application Publication No. 2020/0012608

SUMMARY OF INVENTION

Technical Problem

As described above, it has been desired to propose a technology for processing a neural network at a high speed. Therefore, an object that an example embodiment disclosed herein tries to achieve is to provide a new technology capable of realizing high-speed processing in which some of product-sum operations performed in convolutional layers are omitted.

Solution to Problem

A forward propagation apparatus according to a first aspect of the present disclosure is a forward propagation apparatus for a neural network, including:
mask generation means for generating a binary mask; and
layer execution means for performing an operation for a sparse convolutional layer according to a value at each coordinate of the binary mask, in which the mask generation means:
generates heat maps by performing an operation for a convolutional layer on an input feature map, the number of the heat maps being equal to the number of types of objects to be detected by the neural network;
generates a composite heat map obtained by combining the heat maps the number of which is equal to the number of types of objects to be detected, into one heat map by summing up values of heat maps on a coordinate-by-coordinate basis; and
generates the binary mask by binarizing a value at each coordinate of the composite heat map by using a predetermined threshold.
A learning apparatus according to a second aspect of the present disclosure is a learning apparatus for a forward propagation apparatus for a neural network, including:
first heat map acquisition means for acquiring first heat maps generated by the forward propagation apparatus, the number of the first heat maps being equal to the number of types of objects to be detected by the neural network;
second heat map acquisition means for acquiring second heat maps generated based on correct answer labels of the objects to be detected, the number of the second heat maps being equal to the number of the types of objects to be detected;

loss calculation means for calculating a difference between the first heat maps and the second heat maps; and update means for updating a weighting value of a convolutional layer for generating the first heat maps in the forward propagation apparatus based on the calculated difference, in which the forward propagation apparatus is an apparatus configured to generate a binary mask and performing an operation for a sparse convolutional layer according to a value at each coordinate of the generated binary mask, in a process for generating the binary mask, the forward propagation apparatus:

generates the first heat maps by performing an operation for a convolutional layer on an input feature map, the number of the first heat maps being equal to the number of types of objects to be detected by the neural network;

generates a composite heat map obtained by combining the first heat maps, the number of which is equal to the number of types of objects to be detected, into one heat map by summing up values of the first heat maps, the number of which is equal to the number of types of objects to be detected, on a coordinate-by-coordinate basis; and generates the binary mask by binarizing a value at each coordinate of the composite heat map by using a predetermined threshold.

An information processing system according to a third aspect of the present disclosure includes:

a forward propagation apparatus for a neural network; and a learning apparatus for the forward propagation apparatus, in which the forward propagation apparatus includes:

mask generation means for generating a binary mask; and layer execution means for performing an operation for a sparse convolutional layer according to a value at each coordinate of the binary mask, the mask generation means:

generates first heat maps by performing an operation for a convolutional layer on an input feature map, the number of the first heat maps being equal to the number of types of objects to be detected by the neural network;

generates a composite heat map obtained by combining the first heat maps, the number of which is equal to the number of types of objects to be detected, into one heat map by summing up values of the first heat maps, the number of which is equal to the number of types of objects to be detected, on a coordinate-by-coordinate basis; and generates the binary mask by binarizing a value at each coordinate of the composite heat map by using a predetermined threshold, and the learning apparatus includes:

first heat map acquisition means for acquiring the first heat maps generated by the forward propagation apparatus, the number of the first heat maps being equal to the number of types of objects to be detected by the neural network;

second heat map acquisition means for acquiring second heat maps generated based on correct answer labels of the objects to be detected, the number of the second heat maps being equal to the number of the types of objects to be detected;

loss calculation means for calculating a difference between the first heat maps and the second heat maps; and update means for updating a weighting value of the convolutional layer for generating the first heat maps in the forward propagation apparatus based on the calculated difference.

A processing method according to a fourth aspect of the present disclosure is a processing method for a forward propagation apparatus for a neural network, including:

generating a binary mask; and performing an operation for a sparse convolutional layer according to a value at each coordinate of the binary mask, in which the generating the binary mask includes:

generating heat maps by performing an operation for a convolutional layer on an input feature map, the number of the heat maps being equal to the number of types of objects to be detected by the neural network;

generating a composite heat map obtained by combining the heat maps the number of which is equal to the number of types of objects to be detected, into one heat map by summing up values of heat maps on a coordinate-by-coordinate basis; and generating the binary mask by binarizing a value at each coordinate of the composite heat map by using a predetermined threshold.

A program according to a fifth aspect of the present disclosure causes a computer of a forward propagation apparatus for a neural network to perform:

a mask generation step of generating a binary mask; and a layer execution step of performing an operation for a sparse convolutional layer according to a value at each coordinate of the binary mask, in which the mask generation step includes:

generating heat maps by performing an operation for a convolutional layer on an input feature map, the number of the heat maps being equal to the number of types of objects to be detected by the neural network;

generating a composite heat map obtained by combining the heat maps the number of which is equal to the number of types of objects to be detected, into one heat map by summing up values of heat maps on a coordinate-by-coordinate basis; and generating the binary mask by binarizing a value at each coordinate of the composite heat map by using a predetermined threshold.

Advantageous Effects of Invention

According to the present disclosure, it is possible to provide a new technology capable of realizing high-speed processing in which some of product-sum operations performed in convolutional layers are omitted.

BRIEF DESCRIPTION OF DRAWINGS

FIG. 1 is a block diagram showing an example of a configuration of a forward propagation apparatus according to a first example embodiment;

EXAMPLE EMBODIMENT

Figure 2:
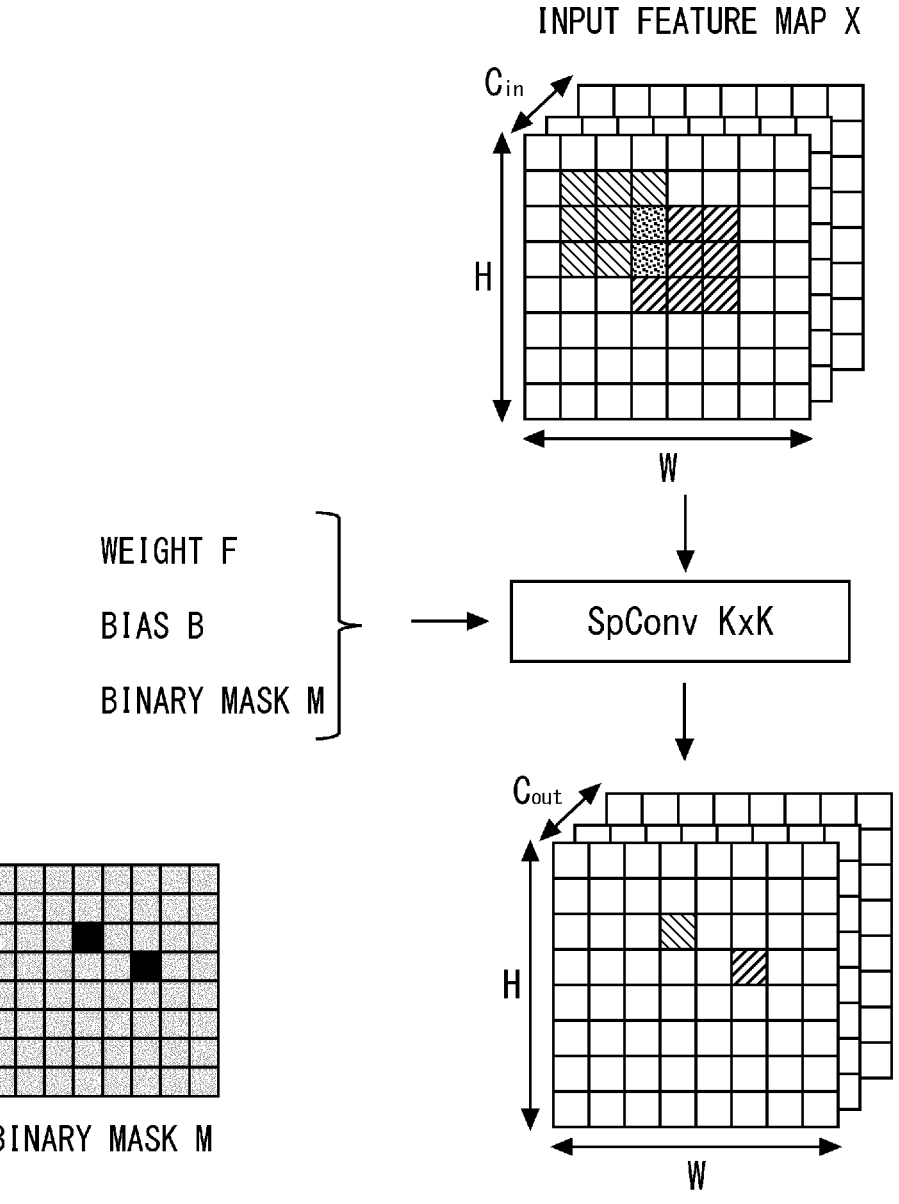
FIG. 2 is a schematic diagram showing calculation of one sparse convolutional layer performed by a layer execution unit.

Firstly, prior to describing an example embodiment, operations in a convolutional layer will be described. As described above, a CNN is mainly composed of convolutional layers. In the following description, $X(x, y, z)$ represents a pixel value at coordinates $(x, y, z)$ in an input feature map X; $F(x, y, z, w)$ represents a value of a weight F; $B(z)$ represents a value of a bias B; $f_{act}$ represents an activation function; and $Z(x, y, z)$ represents a pixel value in an output feature map Z. Further, regarding the coordinates $(x, y, z)$ in the input feature map X and coordinates $(x, y, z)$ in the output feature map Z, x indicates a position in a width direction; y indicates a position in a height direction; and z indicates a position in a channel direction. In this case, a convolutional layer of a kernel of which the sizes in the width direction and height direction are both K, i.e., a convolutional layer having a kernel size K×K, is defined by the below-shown expressions.

$$< \text{Expression 1} >$$

$$Z(x, y, z) =$$

$$f_{act}\left( \sum_{c=0}^{C_{in}-1} \sum_{k_h=-K'}^{K'} \sum_{k_w=-K'}^{K'} X(x + k_w, y + k_h, c) \times F \right.$$

$$\left. (k_w + K', k_h + K', c, z) + B(z) \right)$$

In the expressions, K', X, Z, F and B satisfy the following relations:

$$K' = \lfloor K/2 \rfloor, X \in \mathbb{R}^{W \times H \times C_{in}} Z \in \mathbb{R}^{W \times H \times C_{out}}, F \in \mathbb{R}^{K \times K \times C_{in} \times C_{out}},$$

$$B \in \mathbb{R}^{C_{out}}$$

Note that W is the width of the feature map and H is the height of the feature map. Further, $C_{in}$ is the number of input feature maps and $C_{out}$ is the number of output feature maps.

In a convolutional layer, a bias is added to the result of a product-sum operation (MAC: Multiply ACcumulation) of an input feature map and a weight, and an activation function is further applied thereto. In general, a ReLU (Rectified Linear Unit) function is used as the activation function $f_{act}$.

In an ordinary convolutional layer, when multiplication and addition by $\Sigma$ are separately counted, it is necessary to perform product-sum operations $2KKC_{in}$ times for pixel values $Z(x, y, z)$ of one output feature map. In a convolutional layer, product-sum operations are repeated the same number of times (specifically, $2KKC_{in}$ times) at each coordinate position expressed as follows.

$$(x, y, z) \in \mathbb{R}^{W \times H \times C_{out}}$$

Therefore, it is necessary to perform product-sum operations $2KKC_{in}HWC_{out}$ times in total.

In a CNN, an enormous number of product-sum operations included in convolutional layers is a cause of an increase in the execution time. In this example embodiment, the calculation of a convolutional layer is speeded up by omitting (i.e., by not performing) some of these product-sum operations. Specifically, product-sum operations corresponding to a background part of a feature map are omitted (i.e., are not performed) in order to process a CNN at a high speed.

First Example Embodiment

Firstly, a forward propagation apparatus 100 according to an example embodiment will be described. The forward propagation apparatus 100 is a forward propagation apparatus of a neural network, and is an apparatus for performing, for example, image recognition such as object recognition, semantic segmentation, and human pose estimation by using the neural network.

The forward propagation apparatus 100 includes a binary mask generation unit 101 and a layer execution unit 102 as shown in FIG. 1. The forward propagation apparatus 100 sets parameters of the binary mask generation unit 101 and the layer execution unit 102 by using sparse CNN weights 90, performs forward propagation calculation of the sparse CNN by using an input image 91, and outputs an output result 92. Note that in an inference phase, as the sparse CNN weights 90 (i.e., the weight of each layer of a mask unit 110 and the layer execution unit 102, which will be described later), weights learned by a learning apparatus 200 (which will be described later) are used.

The binary mask generation unit 101 executes a network called a mask unit 110 (see FIGS. 4, 5 and 6) and thereby generates a binary mask. The layer execution unit 102 performs calculation of each layer of the neural network including a sparse convolutional layer. When the layer execution unit 102 executes the sparse convolutional layer, it performs product-sum operations only on a foreground part of an image by using a binary mask.

A method for calculating a sparse convolutional layer performed in the layer execution unit 102 will be described hereinafter with reference to FIGS. 2 and 3. FIG. 2 shows an example in which the layer execution unit 102 executes just one sparse convolutional layer (SpConv: Sparse Convolutional Layer) by using the binary mask generated by the binary mask generation unit 101. The binary mask is a 2D (two-dimensional) image in which each coordinate has a value of either zero or one. Further, in this example embodiment, pixels each having a value "1" (non-zero value) are pixels for which calculation is performed, and pixels each having a value "0" (zero value) are pixels for which calculation is omitted (i.e., is not performed). The size of the binary mask M is equal to that of the output feature map Z. Note that in this example, the size of a convolutional stride is one (i.e., the size of the input feature map X and that of the output feature map Z are equal to each other), so that the size of the binary mask M is equal to that of the input feature map X One layer in which a sparse convolution using a binary mask is performed by the layer execution unit 102 can be defined by the below-shown expression.

< Expression 2 >

$$Y(x, y, z) =$$

$$f_{act}\left(\sum_{c=0}^{C_{in}-1} \sum_{k_h=-K'}^{K'} \sum_{k_w=-K'}^{K'} X(x + k_w, y + k_h, c) \times F \right.$$

$$\left. (k_w + K', k_h + K', c, z) + B(z) \right)$$

$$Z(x, y, z) = \begin{cases} Y(x, y, z) & \text{if } M(x, y) == 1 \\ 0 & \text{if } M(x, y) == 0 \end{cases}$$

In the expressions, Y is a temporary calculation value in the calculation process, and M is the binary mask. Further, the other symbols in Expression (2) are similar to those in Expression (1). In the sparse convolutional layer, for the calculation of an output feature map Z(x, y, z) for coordinates (x, y) (i.e., is a pair of coordinates (x, y)) in which M(x, y) is a non-zero value, product-sum operations are performed $2KKC_{in}$ times as being performed in ordinary convolutions. Meanwhile, no product-sum operation is performed for an output feature map for coordinates (x, y) (i.e., is a pair of coordinates (x, y)) in which M(x, y) is a zero value, so that the value of the output feature map becomes zero. As described above, the layer execution unit 102 performs operations for the sparse convolutional layer according to the value at each coordinate of the binary mask. That is, the layer execution unit 102 performs operations for the sparse convolutional layer by performing product-sum operations on coordinates having values other than the predetermined value (zero value) in the binary mask, and omitting (i.e., not performing) product-sum operations on coordinates having the predetermined value (zero value) in the binary mask.

Note that as shown in the below-shown Expression (3-1), an output feature map for coordinates (x, y) in which M(x, y) is a non-zero value may be calculated by multiplying Y(x, y, z) by $M_f(x, y)$ by using the below-shown expression which has a real number (e.g., a floating-point number).

$$M_f(x, y) \in \mathbb{R}^{W \times H}$$

$$Z(x, y, z) = \begin{cases} Y(x, y, z) \times M_f(x, y) & \text{if } M(x, y) == 1 \\ 0 & \text{if } M(x, y) == 0 \end{cases} \quad < \text{Expression } 3\text{-}1 >$$

Note that, for example, as the value of $M_f$, a large value is set for a relatively important image area in the foreground area (an image area where M has a non-zero value), and a small value is set for a relatively unimportant image area in the foreground area. Specifically, the value of $M_f$ may be set by using, for example, a value of a map output from a resolution adjustment unit 113 (which will be described later) (i.e., a value of a map that has not been binarized). Multiplying by $M_f$ has a function of highlighting a more noteworthy area in the foreground area, and thus leading to an improvement in the accuracy.

Further, as shown in the below-shown Expression (3-2), an output feature map for coordinates (x, y) in which M(x, y) is a non-zero value may be calculated by multiplying Y(x, y, z) by $M_{f'}(z)$ by using the below-shown expression which has a real number.

$$M_{f'}'(x, y) \in \mathbb{R}^{C_{out}}$$

$$Z(x, y, z) = \begin{cases} Y(x, y, z) \times M_{f'}'(x, y) & \text{if } M(x, y) == 1 \\ 0 & \text{if } M(x, y) == 0 \end{cases} \quad < \text{Expression } 3\text{-}2 >$$

Note that, for example, as the value of $M_{f'}$, a large value is set for a relatively important channel, and a small value is set for a relatively unimportant channel. Multiplying by $M_{f'}$ has a function of highlighting a more noteworthy channel in the foreground area, and thus leading to an improvement in the accuracy. Note that $M_f$ and $M_{f'}$ may be calculated by calculating a convolutional layer and a pooling layer for a mask heat map (which will be described later).

In the example shown in FIG. 2, the binary mask generation unit 101 supplies, for each of convolutional layers, a binary mask generated through a predetermined series of processes from a convolutional layer execution unit 111 to a binarization unit 114 (which will be described later). However, in order to reduce the time required for the generation of binary masks, a binary mask that is generated through the above-described predetermined series of processes may be supplied for every plurality of convolutional layers (e.g., every two or three convolutional layers) as shown in FIG. 3. That is, as shown in FIG. 3, a binary mask generated through the above-described predetermined series of processes may be supplied for each group (block) consisting of a plurality of consecutive convolutional layers. Note that FIG. 3 shows an example in which a mask that is generated through the predetermined series of processes is supplied for every two convolutional layers.

Figure 3:
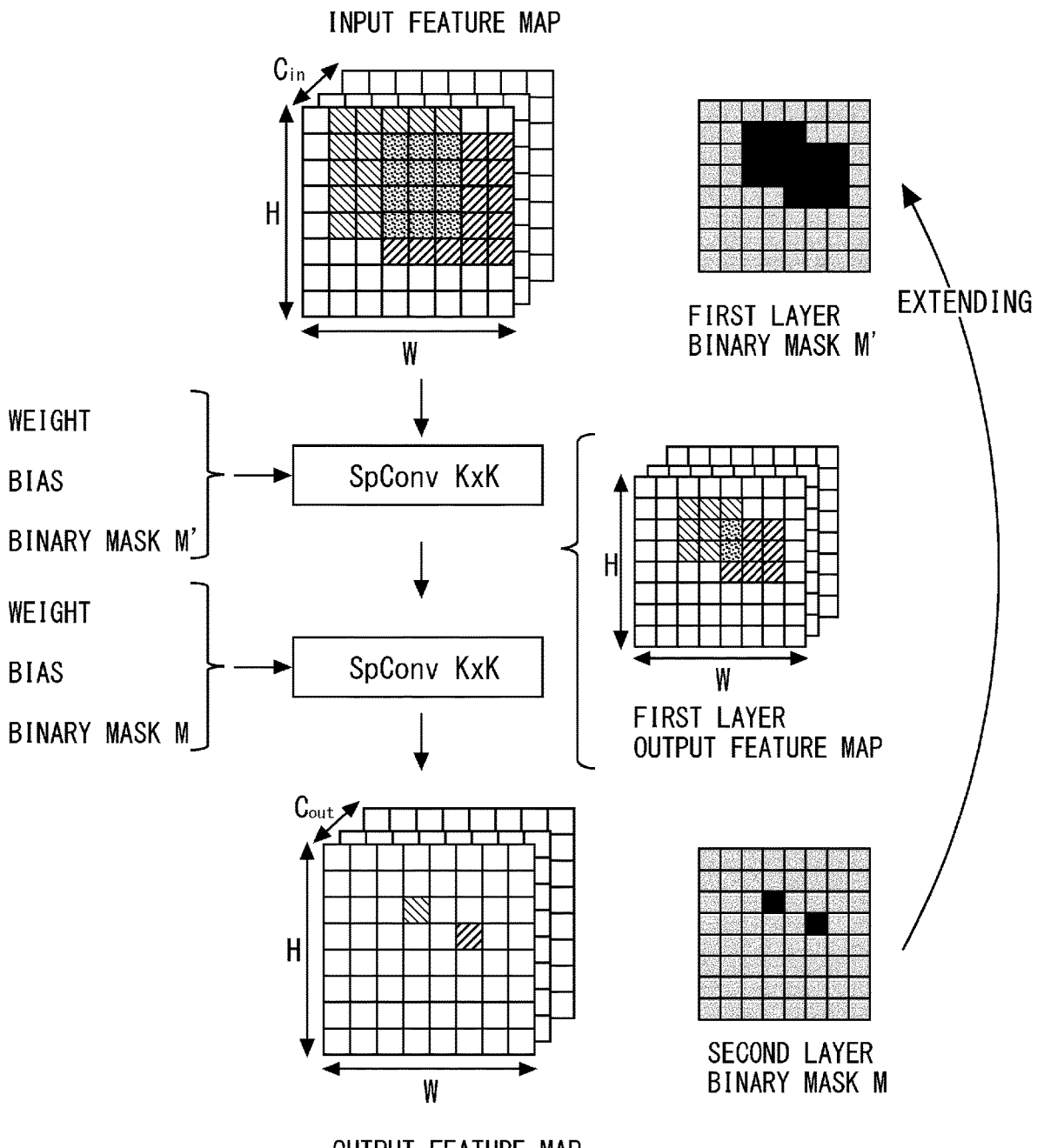
FIG. 3 is a schematic diagram showing calculation of a plurality of sparse convolutional layers performed by the layer execution unit.

In the example shown in FIG. 3, the first convolutional layer performs convolutions by using 38 input pixels and weights in each plane (x, y), and 16 output pixels are calculated. Then, in the second convolutional layer, two output pixels are calculated by using 16 input pixels and weights. That is, in the example shown in FIG. 3, only two pixels need to be calculated for the final layer. However, to do so, 16 pixels need to be calculated in the layer immediately preceding the final layer. As described above, the closer the layer of interest is to the input layer, the larger image area the calculation needs to be performed for. Therefore, a binary mask generated through the predetermined series of processes and a binary mask that is obtained by extending a non-zero image area in this binary mask are used as will be described below. Note that in the following description, a binary mask that is obtained by extending a non-zero image area in the original binary mask will be referred to as an extended binary mask.

When a binary mask M generated through a predetermined series of processing is supplied for every plurality of layers, this binary mask M is used for the sparse convolutional layer of the final layer (in the example shown in FIG. 3, the second layer) in the group. As described above, in the convolution of a layer immediately preceding the final layer, product-sum operations of an image area larger than the non-zero image area in the binary mask M used in the final layer and weights have to be calculated, so that the binary mask M cannot be used. Therefore, the binary mask generation unit 101 generates a binary mask M' which is obtained by extending the binary mask M of the final layer according to the kernel size or the stride of the convolution. However, the extended binary mask is generated by performing an extending process on the binary mask to be extended without performing the predetermined series of processes from the convolutional layer execution unit 111 to the binarization unit 114 (which will be described later). In this extending process, the binary mask generation unit 101 generates, as the extended binary mask M', a binary mask in which the value for the coordinates (x, y) of pixels of the input feature map necessary for calculating an output feature map corresponding to the binary mask M to be extended have non-zero values.

In the case where the number of layers in the group is three, the binary mask generation unit 101 generates an extended binary mask M" by performing an additional extending process by using the extended binary mask M' as the binary mask to be extended. Similarly, in the case where the number of layers in the group is four, the binary mask generation unit 101 generates an extended binary mask M'" by performing an additional extending process by using the extended binary mask M" as the binary mask to be extended. As described above, the binary mask generation unit 101 repeats the extending process a number of times corresponding to the number of layers included in the group, and generates extended binary masks the number of which is one fewer than the number of layers.

Figure 4:
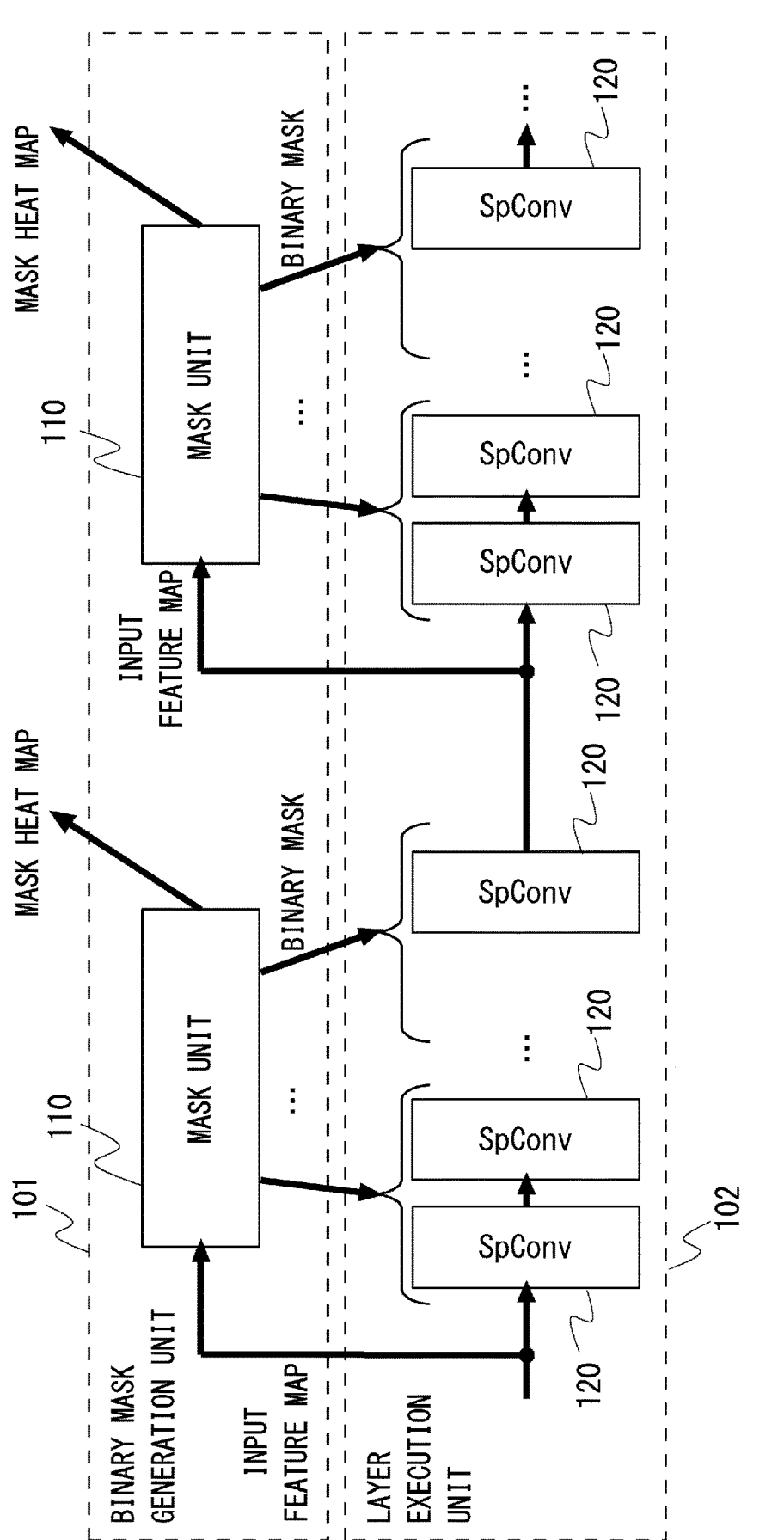
FIG. 4 is a block diagram showing an example of a configuration of a binary mask generation unit and a layer execution unit.
Figure 5:
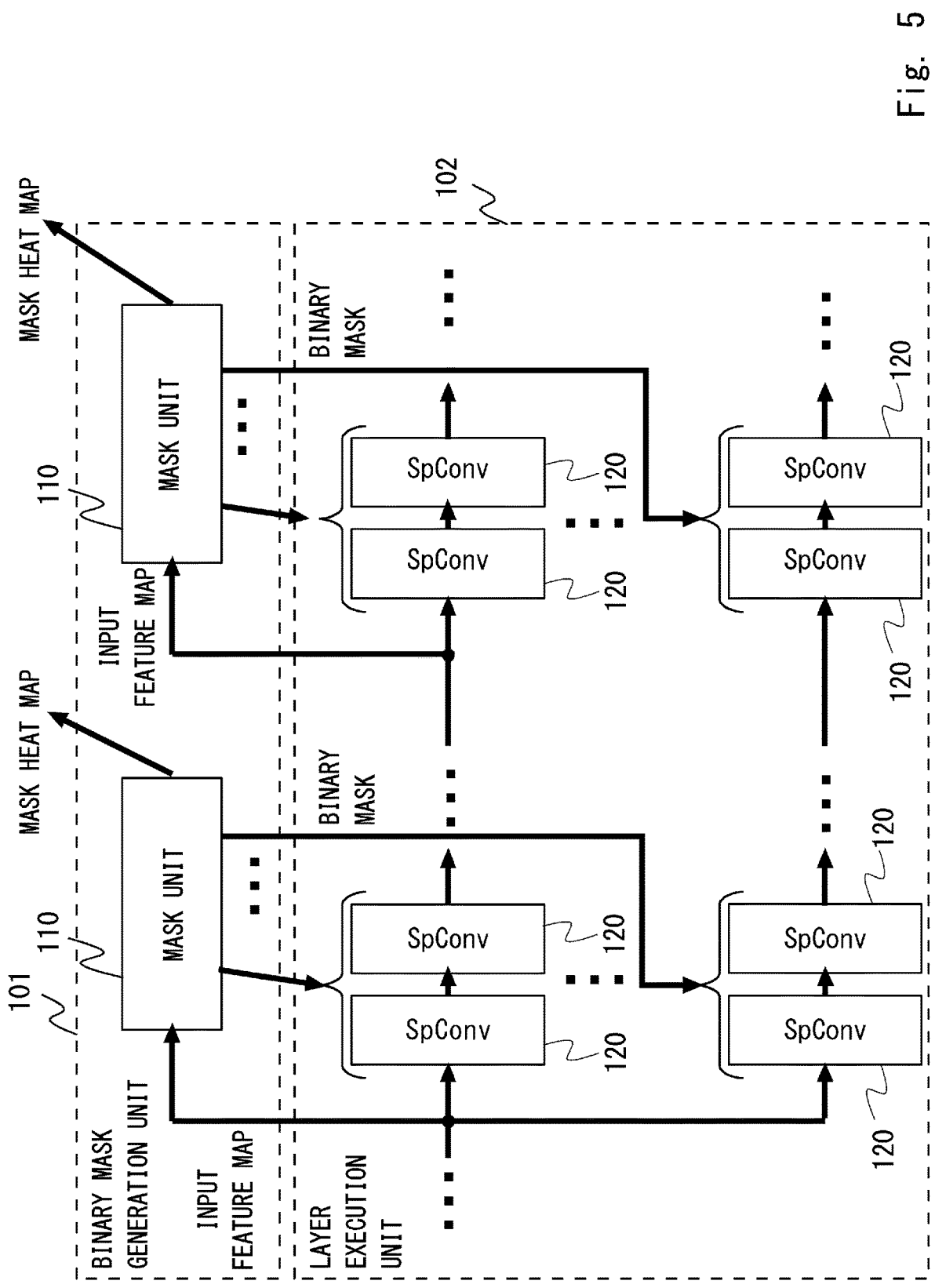
FIG. 5 is a block diagram showing an example of a configuration of a binary mask generation unit and a layer execution unit.
Figure 6:
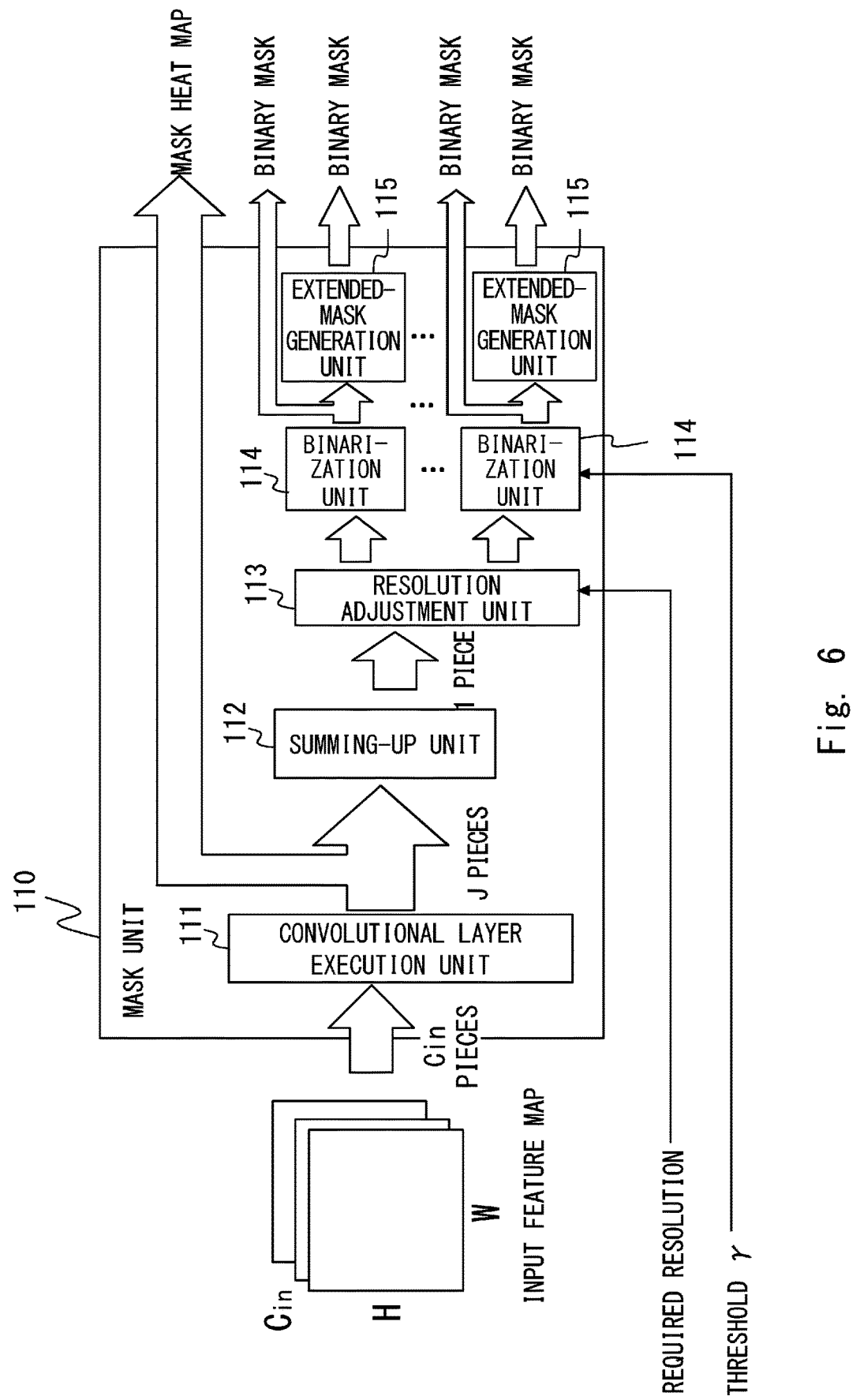
FIG. 6 is a block diagram showing a specific example of a configuration of a mask unit.

The binary mask generation unit 101 will be described with reference to FIGS. 4 to 6. FIGS. 4 and 5 are block diagrams showing examples of configurations of the binary mask generation unit 101 and the layer execution unit 102, respectively. In FIGS. 4 and 5, supplies of input feature maps to mask units 110 and sparse convolutional layers (SpConv) 120, and supplies of binary masks generated by the mask units 110 to the sparse convolutional layers (SpConv) 120 are shown. Further, FIG. 6 is a block diagram showing a specific example of a configuration of the mask unit 110.

As shown in FIG. 4, the binary mask generation unit 101 includes m mask units 110 (m is an integer greater than or equal to one), and performs calculation for each of the mask units 110. The input to the mask unit 110 is an input feature map that is input to, among the sparse convolutional layers 120 included in the group using the binary masks supplied by this mask unit 110, a sparse convolutional layer 120 that is to be executed first. Note that the group does not necessarily have to include a plurality of sparse convolutional layers 120, and may include only one sparse convolutional layer 120. The mask unit 110 outputs, to the group of sparse convolutional layers 120, a binary mask M corresponding to the resolution of the output feature map (resolution defined by a height H and a width W) of the sparse convolutional layers 120 included in this group. Further, the mask unit 110 outputs J mask heat maps each having the height H and the width W as expressed by the below-shown expression.

$$M_h \in \mathbb{R}^{W \times H \times J}$$

Each of the mask heat map is a 2D image having the height H and the width W, generated by the convolutional layer execution unit 111 of the binary mask generation unit 101 (which will be described later), and is used for calculating a loss function in a mask loss calculation unit 206 of the learning apparatus 200 (which will be described later).

FIG. 6 is a block diagram showing an example of an internal structure of the mask unit 110. As shown in FIG. 6, each mask unit 110 includes a convolutional layer execution unit 111, a summing-up unit 112, a resolution adjustment unit 113, a binarization unit 114, and an extended-mask generation unit 115.

The convolutional layer execution unit 111 performs a convolution on the input feature map and outputs J feature maps (mask heat maps). That is, the convolutional layer execution unit 111 executes a convolutional layer that is designed so as to generate J binary images from the input feature map. In the mask loss calculation unit 206 of the learning apparatus 200 (which will be described later), it is necessary to make the number of feature maps of mask heat maps output by the convolutional layer execution unit 111 and the number of feature maps of correct answer heat maps equal to each other. Therefore, the number J of feature maps (hereinafter also referred to as the feature map number J) of mask heat maps output from the convolutional layer execution unit 111 is equal to the number of types of objects to be detected by the neural network of the forward propagation apparatus 100. Note that, specifically, when human pose estimation is performed by the forward propagation apparatus 100, the number of types of objects to be detected is, for example, the number of types of joint points of a human being the coordinates of which are detected by the neural network. Further, when object detection is performed by the forward propagation apparatus 100, the number of types of objects to be detected is, for example, the number of classes (number of object types) used in the object detection by the neural network. Further, when semantic segmentation is performed by the forward propagation apparatus 100, the number of types of objects to be detected is, for example, the number of classes (number of semantic types) used in the semantic segmentation by the neural network. As described above, the convolutional layer execution unit 111 generates, by performing operations for the convolutional layer on the input feature map, mask heat maps the number of which is equal to the number of types of objects to be detected by the neural network.

Note that when the forward propagation apparatus 100 makes an inference, the values of the weights of the convolutional layers by using which the mask unit 110 generates J heat maps are those that have been machine-learned by using heat maps generated based on correct answer labels (which will be described later). That is, in the inference phase, the values of the weights of the convolutional layers executed by the convolutional layer execution unit 111 are those that have been machine-learned by using heat maps generated based on correct answer labels.

The summing-up unit 112 sums up the values of J feature maps (mask heat maps) generated by the convolutional layer execution unit 111 on a coordinate-by-coordinate basis. As a result, the summing-up unit 112 generates a feature map (also referred to as a composite heat map in the present disclosure) that is obtained by combining the J feature maps (mask heat maps) into one feature map (one mask heat map). In the summing-up process by the summing-up unit 112, for example, the sum total of the J feature maps is calculated as shown in the below-shown Expression (4).

$$Z'(x, y) = \sum_{j=0}^{J-1} M_h(x, y, j) \qquad < \text{Expression 4} >$$

In the expressions, $M_h$ is an input feature map (mask heat map) input to the summing-up unit 112 and Z' is an output feature map output from the summing-up unit 112. Note that the summing-up process may not be a simple summation as shown in Expression 4. For example, the summing-up unit 112 may calculate a weighted sum total by weighting J feature maps. For example, a weight having a small value is set for a relatively unimportant class (a class that does not often appear in the data set), and a weight having a large value is set for a relatively important class (a class that does not often appear in the data set). The relatively unimportant class is, for example, a class that appears fewer times in the data set used by the learning apparatus 200 (which will be described later) than other classes do, and can be specified in advance. Similarly, the relatively important class is a class that appears more times in the data set than other classes do, and can be specified in advance. Note that for a class that is known to be unimportant in advance, zero may be set as the value of the weight in order to ignore this class. By calculating the weighted sum total as described above, the calculation of the image area of an unimportant class may be omitted (i.e., be not performed), thus making it possible to speed up the operation and the like even further.

The resolution adjustment unit 113 changes the resolution of the feature map (composite heat map) output from the summing-up unit 112 according to the resolution of the sparse convolutional layer. That is, after the summing-up process, the resolution of the composite heat map is changed to a required resolution (the resolution of the output feature map of each sparse convolutional layer 120 to which the mask unit 110 supplies the binary mask) by a resolution adjustment process performed by the resolution adjustment unit 113. For example, when the resolution adjustment unit 113 generates a mask of which the height H and width W are larger than those of the input feature map of the resolution adjustment unit 113 (i.e., the output feature map of the summing-up unit 112), it performs up-sampling (up-conversion) by using nearest neighbor interpolation or the like. Further, when the resolution adjustment unit 113 generates a mask of which the height H and width W are smaller than those of the input feature map, it performs down-sampling (down-conversion) by using average value pooling, maximum value pooling, or the like. Note that the required resolution can be specified from the parameters of the sparse convolutional layer 120. Further, the resolution adjustment unit 113 can omit the above-described process when the resolution does not need to be adjusted.

As described above, since the resolution adjustment unit 113 can generate feature maps having various resolutions, one mask unit 110 can cope with various resolutions. In this way, one mask unit 110 can supply binary masks to a larger number of sparse convolutional layers (e.g., about ten layers).

The binarization unit 114 generates a binary mask by binarizing a value at each coordinate (i.e., each pair of coordinates) of the mask the resolution of which has been adjusted (i.e., the composite heat map) by using a predetermined threshold value y. The binarization process by the binarization unit 114 is defined by the below-shown Expression 5, where $M_{in}$ is the mask the resolution of which has been adjusted. Note that when the resolution does not need to be adjusted, the binarization unit 114 uses the mask output by the summing-up unit 112 as the mask $M_{in}$.

$$M(x, y) = \begin{cases} 1 & M_{in}(x, y) > \gamma \\ 0 & M_{in}(x, y) \le \gamma \end{cases} \qquad < \text{Expression 5} >$$

The extended-mask generation unit 115 performs the above-described extending process on the binary mask generated by the binarization unit 114, and thereby generates a binary mask that is obtained by expanding a non-zero image area in the binary mask generated by the binarization unit 114. As described above, the extended-mask generation unit 115 does not generate a binary mask by performing the series of processes from the convolutional layer execution unit 111 to the binarization unit 114 again, but generates a new binary mask by using the binary mask output from the binarization unit 114. Note that as described above, the extended-mask generation unit 115 may further generate another new binary mask by performing another extending process on the binary mask obtained by the extending process.

As described above, the binary mask output from the binarization unit 114 is generated for the operations for the final layer of consecutive sparse convolutional layers 120 as in the case of the second layer shown in FIG. 3. Then, the extended-mask generation unit 115 generates a binary mask for operations for a sparse convolutional layer immediately preceding the final layer from the binary mask generated by the binarization unit 114. Further, if necessary, the extended-mask generation unit 115 generates a binary mask for operations for a sparse convolutional layer preceding the aforementioned sparse convolutional layer immediately preceding the final layer. By the above-described configuration, it is possible to reduce the time required for the process for generating a binary mask for each sparse convolutional layer.

The binarization unit 114 and the extended-mask generation unit 115 supply the generated binary mask to the sparse convolutional layers 120. Note that the sparse convolutional layers 120 are not limited to those connected in series as shown in FIG. 4, but may be connected, for example, in parallel as shown in FIG. 5. That is, the mask unit 110 can generate and supply a binary mask to any types of structures of CNNs.

Next, a learning apparatus 200 for the forward propagation apparatus 100 will be described. The learning apparatus 200 learns parameters of convolutional layers to be executed by the convolutional layer execution unit 111 of the mask unit 110 of the forward propagation apparatus 100 and parameters of the neural network to be executed by the layer execution unit 102.

Figure 7:
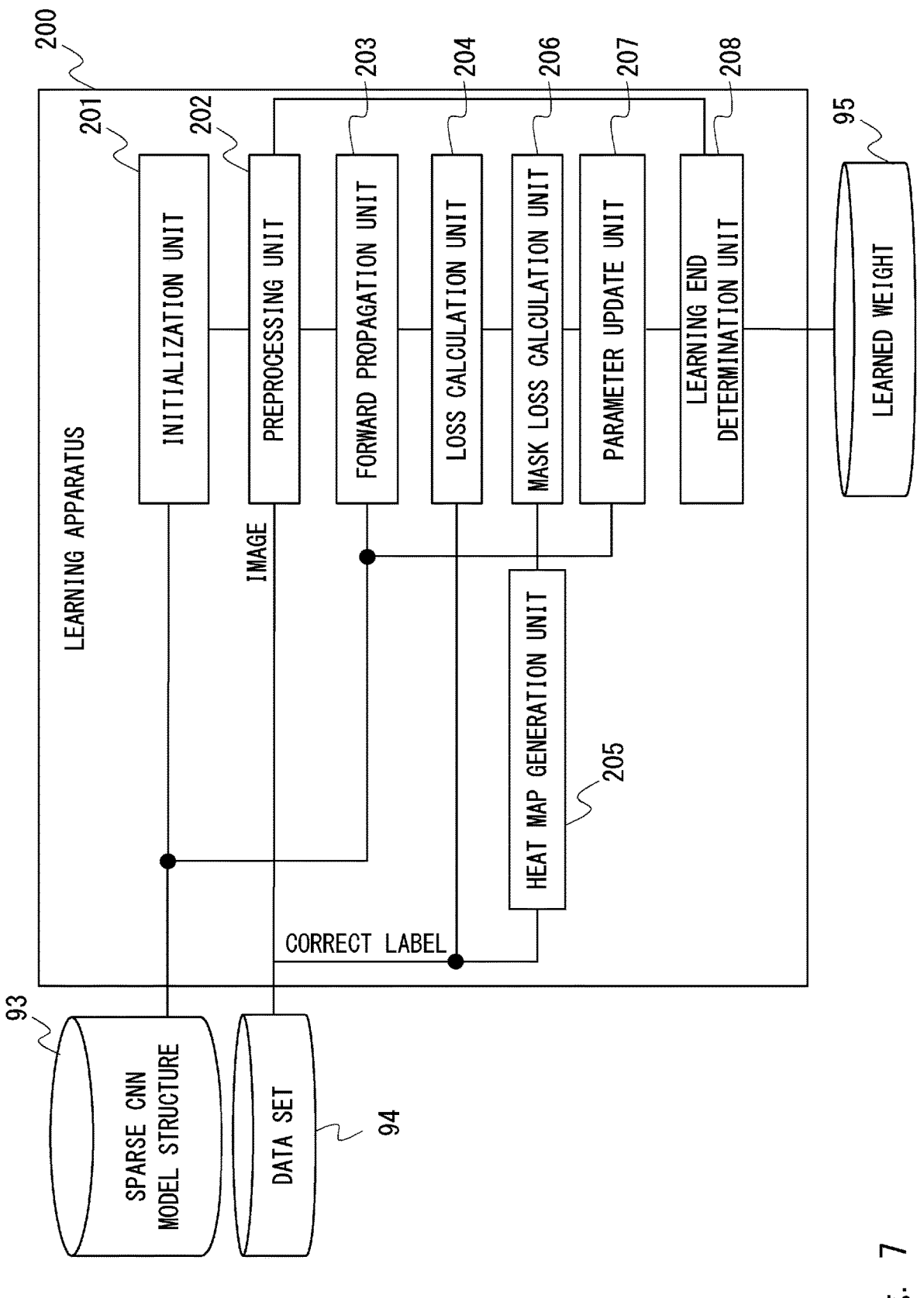
FIG. 7 is a block diagram showing an example of a configuration of a learning apparatus according to the first example embodiment.

FIG. 7 is a block diagram showing an example of a configuration of the learning apparatus 200. The learning apparatus 200 uses a model structure 93 of a sparse CNN and a data set 94 as its inputs, and outputs learned weights 95. The model structure 93 of the sparse CNN includes data representing the structure of the mask unit 110 of the binary mask generation unit 101 and data representing the CNN structure executed by the layer execution unit 102. Further, the data set 94 is image data to which correct answer labels have been provided. The learned weights 95 include learned values of weights used in the convolutional layer execution unit 111 of the mask unit 110 and learned values of weights used in the CNN that the layer execution unit 102 executes.

As shown in FIG. 7, the learning apparatus 200 includes an initialization unit 201, a preprocessing unit 202, a forward propagation unit 203, a loss calculation unit 204, a heat map generation unit 205, a mask loss calculation unit 206, a parameter update unit 207, and a learning end determination unit 208. The learning performed by the learning apparatus 200 is different from an ordinary learning procedure particularly in that it includes processing performed by the heat map generation unit 205 and processing performed by the mask loss calculation unit 206.

The initialization unit 201 initializes parameters such as weights of the sparse CNN. The initialization performed by the initialization unit 201 is initialization of not only the weights of the sparse convolutional layer 120 to be executed by the layer execution unit 102, but also all the learning parameters of the sparse CNN such as weights in the convolutional layer execution unit 111 of the mask unit 110.

The preprocessing unit 202 performs predetermined preprocessing (e.g., rotation processing and distortion correction processing for images) on input images that are input to the learning apparatus 200 for learning (i.e., images included in the data set 94).

The forward propagation unit 203 performs forward propagation processing in the forward propagation apparatus 100 by using the input image preprocessed by the preprocessing unit 202 and the model structure 93 of the sparse CNN (i.e., the forward propagation apparatus 100). In this way, the forward propagation processing such as calculation of each sparse convolutional layer 120 and calculation of each mask unit 110 is performed.

Figure 8:
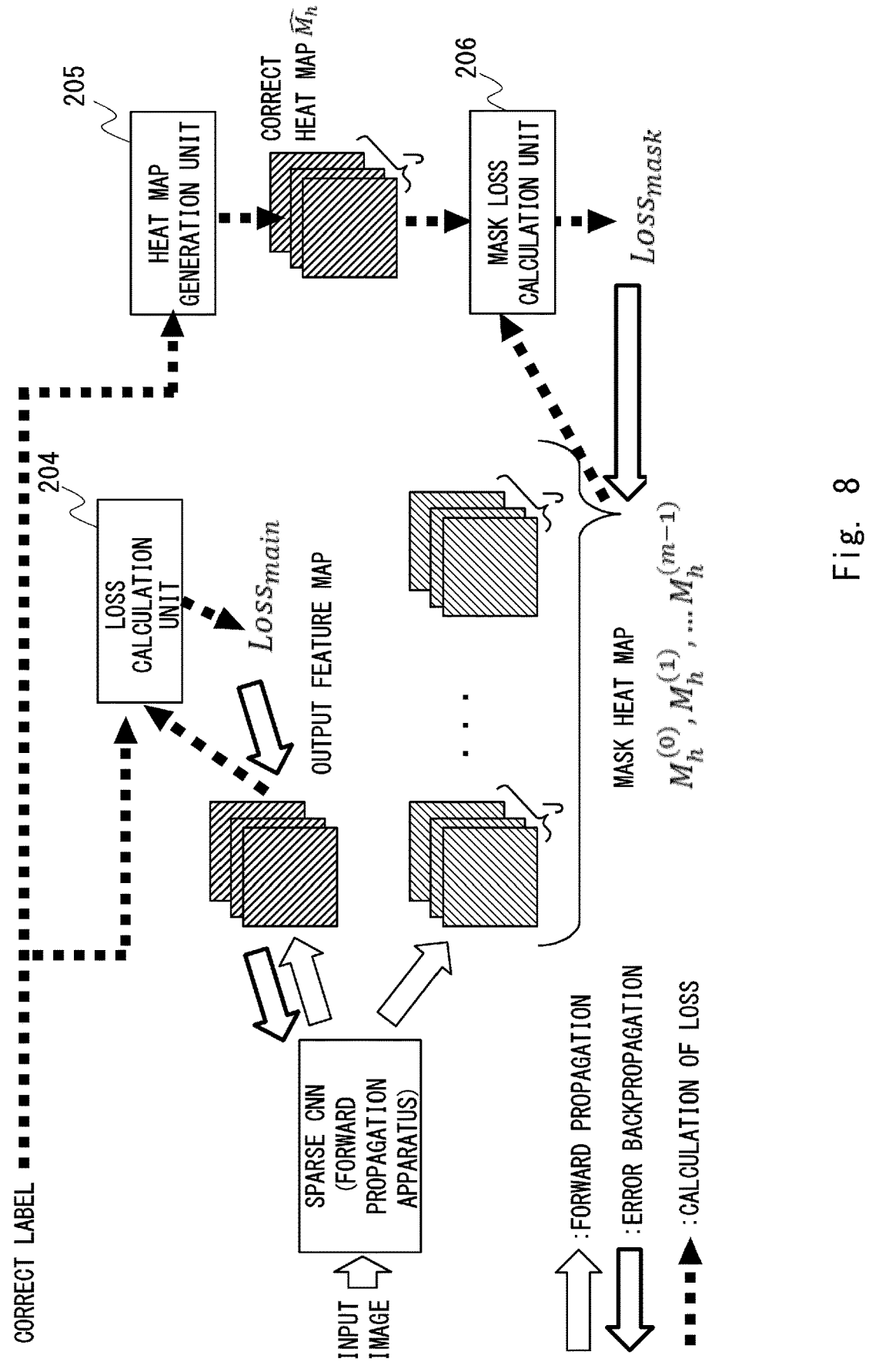
FIG. 8 is a schematic diagram for explaining calculation of a loss.

Next, the loss calculation unit 204, the heat map generation unit 205, and the mask loss calculation unit 206 will be described with reference to FIG. 8. FIG. 8 is a schematic diagram for explaining the calculation of a loss.

The loss calculation unit 204 calculates a first loss function $Loss_{main}$. The first loss function $Loss_{main}$ is similar to a loss function typically calculated in a CNN. The first loss function $Loss_{main}$ is a loss function for calculating a loss by using correct answer labels included in the data set 94 and output feature maps output from the layer execution unit 102 (i.e., output feature maps output from the forward propagation apparatus 100).

The heat map generation unit 205 generates the correct heat map $$\widehat{M_h}$$

necessary for calculating a second loss function $Loss_{mask}$. The second loss function $Loss_{mask}$ is a loss function that is calculated in order to learn weights of the mask unit 110 and is calculated by the mask loss calculation unit 206 (which will be described later). The heat map generation unit 205 generates correct answer heat maps by arranging a 2D normal distribution so as to correspond to the positions of coordinates specified by correct answer labels. More specifically, the heat map generation unit 205 generates a heat map (2D image) in which a 2D normal distribution is arranged, and in which it has the maximum value of the normal distribution at the position at which the object to be detected is located.

Figure 9:
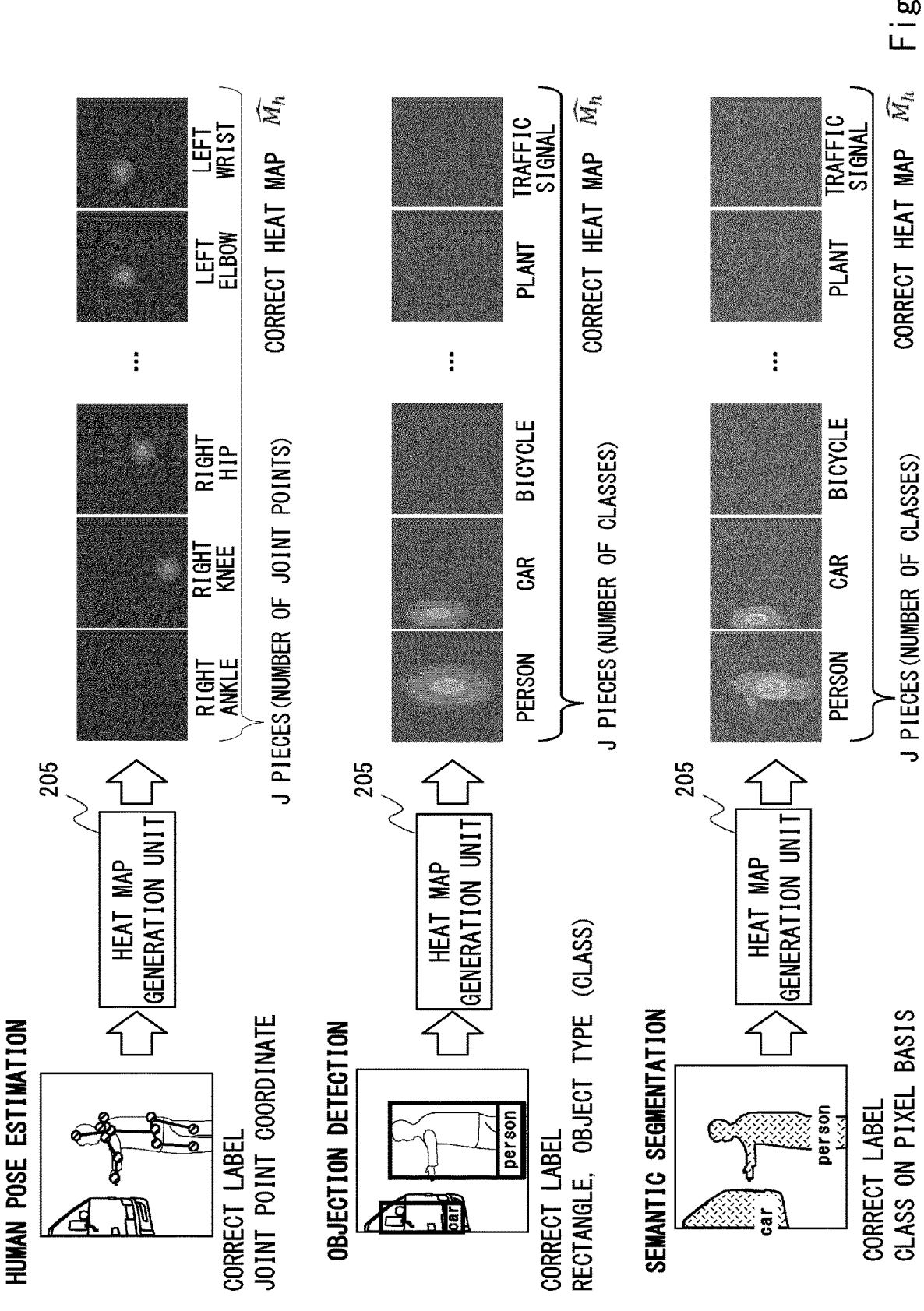
FIG. 9 is a schematic diagram showing an example of generation of a correct answer heat map by a heat map generation unit.

FIG. 9 is a schematic diagram showing an example of generation of a correct answer heat map by the heat map generation unit 205. For example, when a human pose estimation is performed by the forward propagation apparatus 100, the below-shown correct answer heat map $$\widehat{M_h}$$

can be generated by arranging a 2D normal distribution in such a manner that the position of the maximum value of the normal distribution coincide with coordinates of joint points indicated by correct answer labels.

That is, in this case, the heat map generation unit 205 generates, as the correct answer heat map, a heat map in which the maximum values of a 2D normal distribution are present at the coordinates of joint points of a human being indicated by correct answer labels for the human pose estimation. Note that in the case of a human pose estimation, the number J of feature maps (hereinafter also referred to as the feature map number J) of the correct answer heat maps is equal to the number of joint points to be detected. That is, feature maps each of which corresponds to a respective one of joint points are generated.

Further, for example, when object detection is performed by the forward propagation apparatus 100, the below-shown correct answer heat map $$\widehat{M_h}$$

can be generated by deforming the 2D normal distribution so as to conform to a rectangle (bounding box surrounding the object) indicated by correct answer labels, and arranging the normal distribution in such a manner that the position of the maximum value of the normal distribution coincides with the position (the center of gravity) inside the bounding box. In the deformation of the 2D normal distribution, the variance is adjusted. For example, as shown in FIG. 9, a rectangle corresponding to a human being is vertically long, so that when a correct answer heat map for the detection of a human being is to be generated, the 2D normal distribution is deformed so that the variance in the y-direction increases. As described above, when object detection is performed by the forward propagation apparatus 100, the heat map generation unit 205 generates, as the correct answer heat map, a heat map in which the maximum value of the 2D normal distribution is present inside the rectangular area indicated by correct answer labels for the object detection. Note that in the case of object detection, the feature map number J of the correct answer heat maps is equal to the number of classes (number of object types) used in the object detection. That is, feature maps each of which corresponds to a respective one of classes are generated.

Further, when semantic segmentation is performed by the forward propagation apparatus 100, firstly, the heat map generation unit 205 calculates, from the object area of each object indicated by correct answer labels, a rectangle surrounding this object area. Then, the heat map generation unit 205 generates the below-shown correct answer heat map $$\widehat{M_h}$$

by deforming the 2D normal distribution so as to conform to the aforementioned rectangle, arranging the normal distribution in such a manner that the position of the maximum value of the normal distribution coincides with the position (the center of gravity) inside the rectangle, and trimming the normal distribution according to the correct answer labels. That is, the heat map generation unit 205 generates a heat map in which the values of coordinates corresponding to areas outside the object area indicated by correct answer labels are zero. Note that the process for deforming the 2D normal distribution that is performed by the heat map generation unit 205 when semantic segmentation is performed by the forward propagation apparatus 100 is the same as the process that is performed when object detection is performed by the forward propagation apparatus 100. As described above, when semantic segmentation is performed by the forward propagation apparatus 100, the heat map generation unit 205 performs the following processes. The heat map generation unit 205 generates, as the correct answer heat map, a heat map in which the maximum value of the 2D normal distribution is present in a rectangular area surrounding an area indicated by correct answer labels for semantic segmentation, and the values outside the area indicated by the correct answer labels are set to zero. Note that in the case of semantic segmentation, the feature map number J of the correct answer heat maps is equal to the number of classes (number of semantic types) used in the semantic segmentation. That is, feature maps each of which corresponds to a respective one of classes are generated.

The mask loss calculation unit 206 calculates a second loss function $\text{Loss}_{mask}$. As shown in FIG. 8, the function $\text{Loss}_{mask}$ is calculated by using the below-shown mask heat maps $$M_h^{(0)}, M_h^{(1)}, \dots M_h^{(m-1)}$$

generated by m mask units 110 included in the sparse CNN (forward propagation apparatus 100), and below-shown correct heat map $$\widehat{M_h}$$

generated by the heat map generation unit 205.

The mask loss calculation unit 206 calculates, as the calculation of the second loss function $\text{Loss}_{mask}$, differences between the mask heat maps generated by the mask unit 110 and the correct answer heat maps generated by the heat map generation unit 205. The mask loss calculation unit 206 calculates the function $\text{Loss}_{mask}$ expressed by the below-shown Expression (6) by using, for example, a mean squared error (MSE: Mean Squared Error).

$$\text{Loss}_{mask} = \frac{1}{HWJ} \sum_{j=0}^{m-1} \sum_{a_1 \in M_h^{(j)}, a_2 \in M_h^{(j)}} (a_1 - a_2)^2 \qquad < \text{Expression 6} >$$

In the expression, $$M_h^{(j)}$$

is the mask heat map of, among the m mask units 110, the jth mask unit 110. Further, the below-shown relations hold.

$$M_h^{(j)} \in \mathbb{R}^{W \times H \times J}, \hat{M}_h \in \mathbb{R}^{W \times HX \times J}$$

The loss function $\text{Loss}_{all}$ of the whole sparse CNNs is defined by the weighted sum of $\text{Loss}_{main}$ and $\text{Loss}_{mask}$ as shown in the below-shown Expression (7).

$$\text{Loss}_{all} = \text{Loss}_{main} + \alpha \cdot \text{Loss}_{mask} \qquad < \text{Expression 7} >$$

Note that $\alpha$ ($0<\alpha$) is a parameter for adjusting the balance between $\text{Loss}_{mask}$ and $\text{Loss}_{main}$. As in this example embodiment, it is possible to, by using the $\text{Loss}_{mask}$ calculated by using correct answer labels, accurately learn a 2D binary mask representing pixels at which convolutions are to be performed.

The parameter update unit 207 updates parameters such as the weights of the sparse CNN by performing error back-propagation using the loss function shown in Expression (7).

Further, the learning end determination unit 208 determines whether or not a predetermined learning end condition is satisfied, and when the learning end condition is satisfied, performs control so as to output the values of learned parameters (weights).

Figure 10:
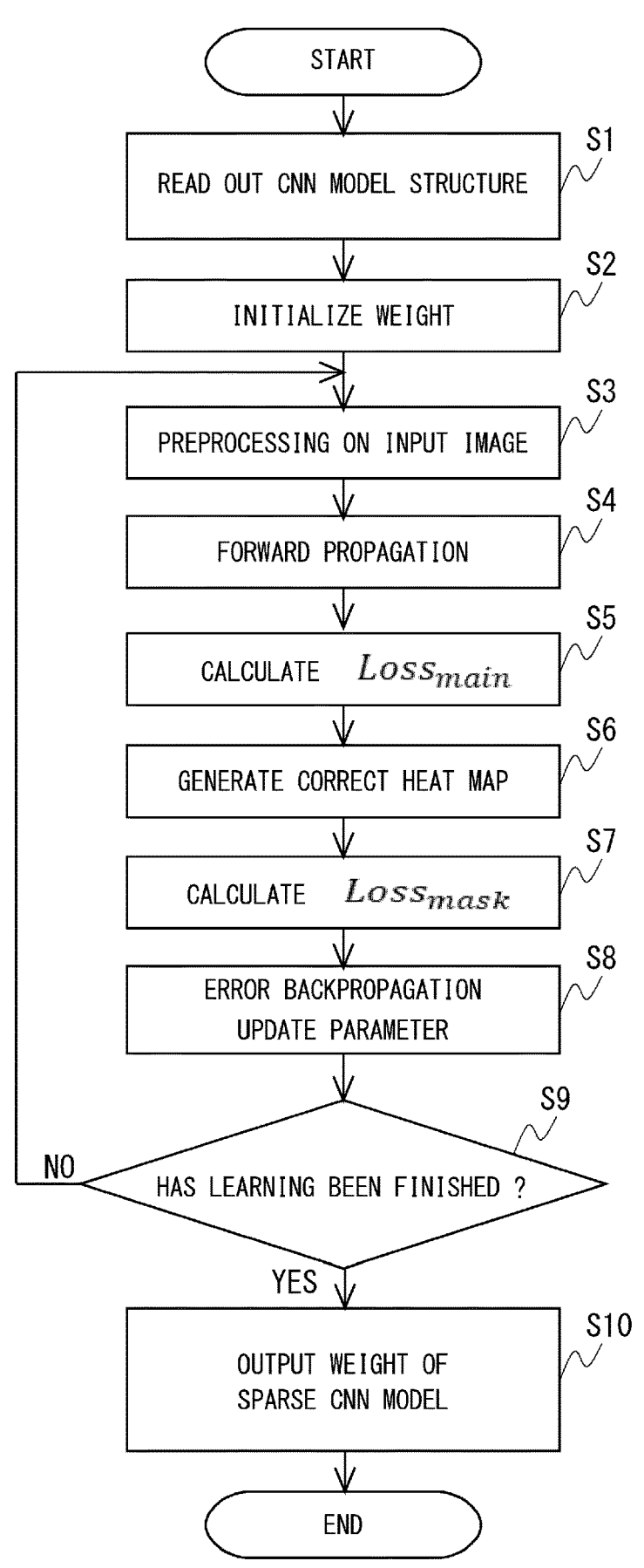
FIG. 10 is a flowchart showing an example of operations performed by the learning apparatus according to the first example embodiment.

FIG. 10 is a flowchart showing an example of operations performed by the learning apparatus 200. A flow of processes performed by components of the above-described learning apparatus 200 will be described hereinafter with reference to FIG. 10.

In a step S1, prior to performing the learning, the learning apparatus 200 reads out a model structure 93 of a sparse CNN from a storage device. Next, in a step S2, the initialization unit 201 initializes parameters (weights). Next, in a step S3, the preprocessing unit 202 performs predetermined preprocessing on an input image. Next, in a step S4, the forward propagation unit 203 performs forward propagation processing by using the preprocessed input image and the model structure 93 of the sparse CNN. In s step S5, the loss calculation unit 204 calculates a first loss function $\text{Loss}_{main}$. Then, in a step S6, the heat map generation unit 205 generates a correct answer heat map based on correct answer labels included in the data set 94. In a step S7, the mask loss calculation unit 206 calculates a second loss function $\text{Loss}_{mask}$. After that, in a step S8, the parameter update unit 207 updates parameters by performing error backpropagation. Next, in a step S9, the learning end determination unit 208 determines whether or not a predetermined learning end condition is satisfied. For example, the learning end determination unit 208 determines whether or not a series of processes is repeated a predetermined number of times. When the predetermined learning end condition is not satisfied, the process returns to the step S3. In this way, the series of processes is repeated for each of various images included in the data set 94. When the predetermined learning end condition is satisfied, the process proceeds to a step S10. In the step S10, the learning apparatus 200 outputs parameters such as weights of the sparse CNN (weights of convolutional layers of the mask unit 110 and weights of sparse convolutional layers of the layer execution unit 102) as learned weights 95. Therefore, when the forward propagation apparatus 100 makes an inference, weights learned by the learning apparatus 200 are used.

Figure 11:
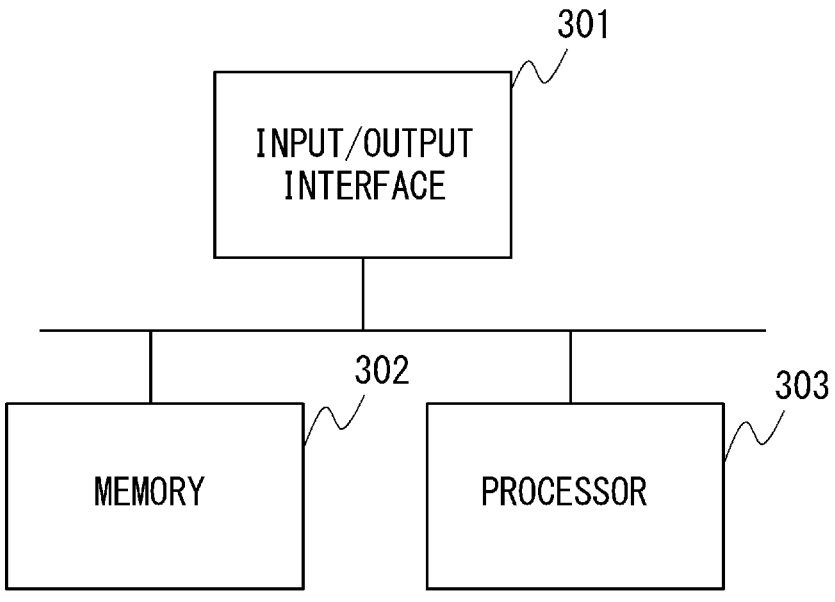
FIG. 11 is a block diagram showing an example of a hardware configuration of the forward propagation apparatus and the learning apparatus according to the first example embodiment.

Next, an example of a hardware configuration of each of the forward propagation apparatus 100 and the learning apparatus 200 will be described. FIG. 11 is a block diagram showing an example of a hardware configuration of each of the forward propagation apparatus 100 and the learning apparatus 200. As shown in FIG. 11, each of the forward propagation apparatus 100 and the learning apparatus 200 includes an input/output interface 301, a memory 302, and a processor 303.

The input/output interface 301 is an interface for connecting to other apparatuses so that they can communicate with each other as required.

The memory 302 is composed of, for example, a combination of a volatile memory and a nonvolatile memory. The memory 302 is used to store software (a computer program) including at least one instruction that is executed by the processor 303, and data and like used in various processes.

The processor 303 performs a process performed by each of the above-described components by loading the software (the computer program) from the memory 302 and executes the loaded software. The processor 303 may be, for example, a microprocessor, an MPU (Micro Processor Unit), or a CPU (Central Processing Unit). The processor 303 may include a plurality of processors.

As described above, each of the forward propagation apparatus 100 and the learning apparatus 200 has functions as a computer.

In the above-described examples, the program includes a set of instructions (or software codes) that, when read into a computer, causes the computer to perform one or more of the functions described in the example embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disc (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

The example embodiment has been described above. According to this example embodiment, by a binary mask generated by the binary mask generation unit 101, it is possible to realize high-speed processing in which some of the product-sum operations performed in the sparse convolutional layers 120 are omitted. More specifically, it is possible to perform product-sum operations on areas where the object to be detected is present (i.e., the foreground area) and omit (i.e., not perform) product-sum operations in other areas (i.e., the background area). Further, in particular, parameters for generating a binary mask are learned by using correct answer labels. More specifically, by comparing a heat map generated based on the shape of the object indicated by correct answer data with a heat map generated by a neural network, the neural network is trained to generate a binary mask corresponding to the shape of the object to be detected. Therefore, the foreground area can be accurately specified (i.e., located). Further, as described above, the mask unit 110 includes the resolution adjustment unit 113 and the extended-mask generation unit 115, and can generate various binary masks while reducing the processing load (or preventing the processing load from significantly increasing). Therefore, the time required for generating a binary mask can be reduced. Further, in this example embodiment, since a binary mask is generated by the mask unit 110, which has a simpler structure than that of a CNN model, the processing speed can be improved compared with when a binary mask is generated by the CNN model.

Second Example Embodiment

Figure 12:
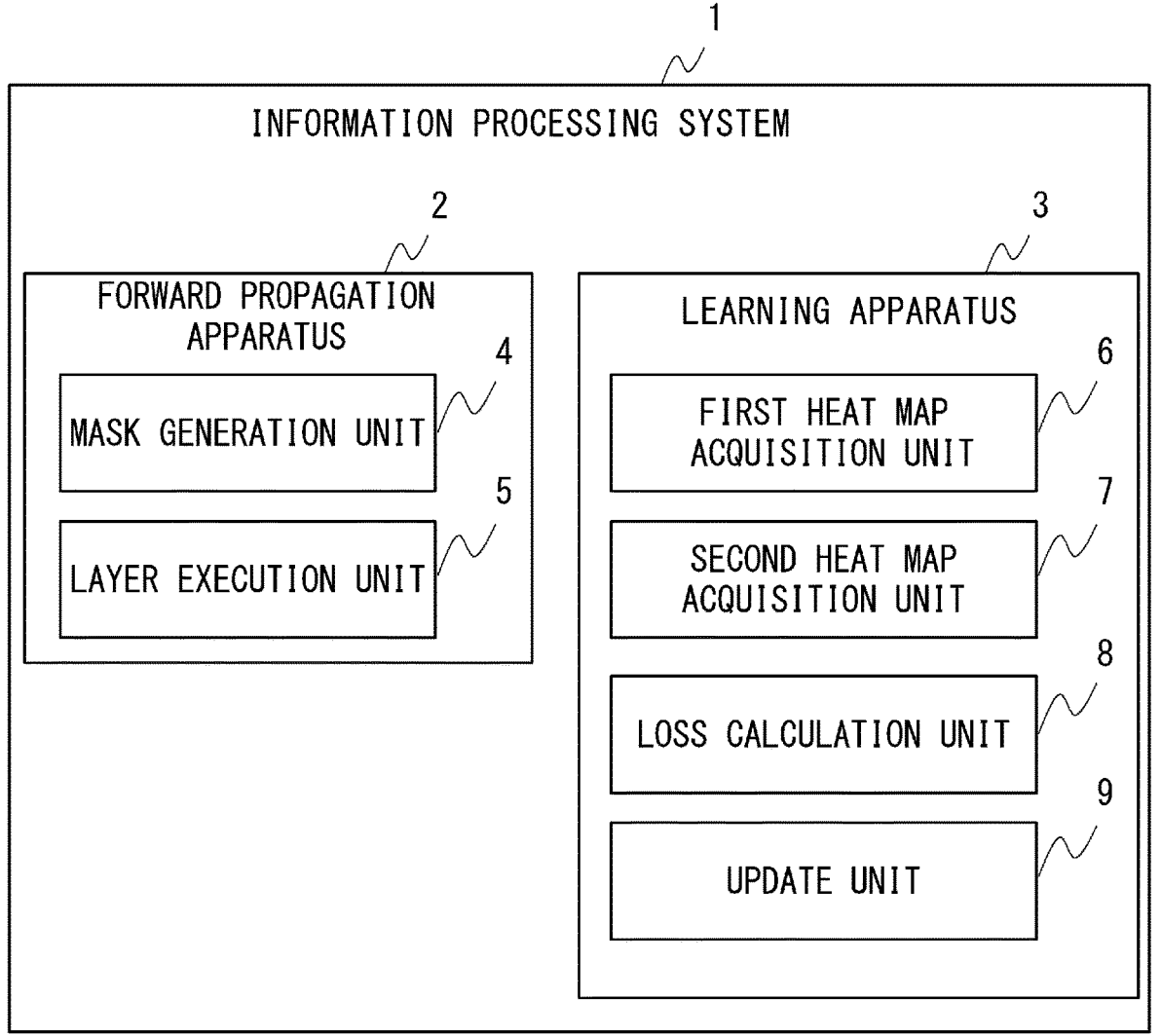
FIG. 12 is a block diagram showing an example of a configuration of an information processing system according to a second example embodiment.

Next, a second example embodiment will be described. The second example embodiment is an example embodiment composed of characteristic elements of the first example embodiment. FIG. 12 is a block diagram showing an example of a configuration of an information processing system 1 according to the second example embodiment. The information processing system 1 includes a forward propagation apparatus 2 for a neural network and a learning apparatus 3 for the forward propagation apparatus 2.

The forward propagation apparatus 2 includes a mask generation unit 4 that generates a binary mask and a layer execution unit 5 that performs operations for a sparse convolutional layer according to the value at each coordinate (i.e., each pair of coordinates) in the generated binary mask. In particular, the mask generation unit 4 generates a binary mask as follows. The mask generation unit 4 generates a predetermined number of first heat maps by performing operations for convolutional layers on an input feature map. Note that the predetermined number is the number of types of objects to be detected by the neural network. Next, the mask generation unit 4 generates a composite heat map that is obtained by summing up the value at each coordinate of the predetermined number of first heat maps and thereby combining the predetermined number of first heat maps into one heat map. Then, the mask generation unit 4 generates a binary mask by binarizing the value at each coordinate of the composite heat map using a predetermined threshold.

The learning apparatus 3 includes a first heat map acquisition unit 6, a second heat map acquisition unit 7, a loss calculation unit 8, and an update unit 9. The first heat map acquisition unit 6 acquires the predetermined number of first heat maps generated by the forward propagation apparatus 2. The second heat map acquisition unit 7 acquires the predetermined number of second heat maps generated based on correct answer labels of the object to be detected. The loss calculation unit 8 calculates differences between the first heat maps acquired by the first heat map acquisition unit 6 and the second heat maps acquired by the second heat map acquisition unit 7. Then, the update unit 9 updates the values of weights of the convolutional layers for generating the first heat maps in the forward propagation apparatus 2 based on the differences calculated by the loss calculation unit 8.

According to this example embodiment, the learning for generating a binary mask is performed by the learning apparatus 3, and the forward propagation apparatus 2 can realize high-speed processing by omitting (i.e., not performing) some of the product-sum operations by using the generated binary mask.

Although the present invention is described above with reference to example embodiments, the present invention is not limited to the above-described example embodiments. Various modifications that can be understood by those skilled in the art can be made to the configuration and details of the present invention within the scope of the invention.

The whole or part of the example embodiments disclosed above can be described as, but not limited to, the following supplementary notes.

(Supplementary Note 1)

A forward propagation apparatus for a neural network, comprising:

mask generation means for generating a binary mask; and layer execution means for performing an operation for a sparse convolutional layer according to a value at each coordinate of the binary mask, wherein the mask generation means:

generates heat maps by performing an operation for a convolutional layer on an input feature map, the number of the heat maps being equal to the number of types of objects to be detected by the neural network;

generates a composite heat map obtained by combining the heat maps the number of which is equal to the number of types of objects to be detected, into one heat map by summing up values of heat maps on a coordinate-by-coordinate basis; and generates the binary mask by binarizing a value at each coordinate of the composite heat map by using a predetermined threshold.

(Supplementary Note 2)

The forward propagation apparatus described in Supplementary note 1, wherein a value of a weight of the convolutional layer for generating heat maps the number of which is equal to the number of types of objects to be detected, is a value that is machine-learned by using a heat map generated based on a correct answer label.

(Supplementary Note 3)

The forward propagation apparatus described in Supplementary note 1 or 2, wherein the mask generation means further changes a resolution of the composite heat map according to a resolution of the sparse convolutional layer.

(Supplementary Note 4)

The forward propagation apparatus described in any one of Supplementary notes 1 to 3, wherein the mask generation means generates the binary mask for an operation for a final layer of consecutive sparse convolutional layers, and further generates a binary mask for an operation for a sparse convolutional layer preceding the final layer from the generated binary mask.

(Supplementary Note 5)

The forward propagation apparatus described in any one of Supplementary notes 1 to 4, wherein the number of types of objects to be detected is the number of types of joint points of a human being coordinates of which are detected by the neural network.

(Supplementary Note 6)

The forward propagation apparatus described in any one of Supplementary notes 1 to 4, wherein the number of types of objects to be detected is the number of classes used in object detection by the neural network.

(Supplementary Note 7)

The forward propagation apparatus described in any one of Supplementary notes 1 to 4, wherein the number of types of objects to be detected is the number of classes used in semantic segmentation by the neural network.

(Supplementary Note 8)

A learning apparatus for a forward propagation apparatus for a neural network, comprising:

first heat map acquisition means for acquiring first heat maps generated by the forward propagation apparatus, the number of the first heat maps being equal to the number of types of objects to be detected by the neural network;

second heat map acquisition means for acquiring second heat maps generated based on correct answer labels of the objects to be detected, the number of the second heat maps being equal to the number of the types of objects to be detected;

loss calculation means for calculating a difference between the first heat maps and the second heat maps; and update means for updating a weighting value of a convolutional layer for generating the first heat maps in the forward propagation apparatus based on the calculated difference, wherein the forward propagation apparatus is an apparatus configured to generate a binary mask and performing an operation for a sparse convolutional layer according to a value at each coordinate of the generated binary mask, in a process for generating the binary mask, the forward propagation apparatus:

generates the first heat maps by performing an operation for a convolutional layer on an input feature map, the number of the first heat maps being equal to the number of types of objects to be detected by the neural network;

generates a composite heat map obtained by combining the first heat maps, the number of which is equal to the number of types of objects to be detected, into one heat map by summing up values of the first heat maps, the number of which is equal to the number of types of objects to be detected, on a coordinate-by-coordinate basis; and generates the binary mask by binarizing a value at each coordinate of the composite heat map by using a predetermined threshold.

(Supplementary Note 9)

The learning apparatus described in Supplementary note 8, further comprising correct heat map generation means for generating a heat map as the second heat map by arranging a 2D normal distribution so as to correspond to position of coordinate specified by the correct answer labels.

(Supplementary Note 10)

The learning apparatus described in Supplementary note 9, wherein the correct answer heat map generation means generates, as the second heat map, a heat map in which a maximum value of the 2D normal distribution is present at a coordinate of a joint point of a human being indicated by a correct answer label for human pose estimation using the neural network.

(Supplementary Note 11)

The learning apparatus described in Supplementary note 9, wherein the correct answer heat map generation means generates, as the second heat map, a heat map in which a maximum value of the 2D normal distribution is present inside a rectangular area indicated by a correct answer label for object detection using the neural network.

(Supplementary Note 12)

The learning apparatus described in Supplementary note 9, wherein the correct answer heat map generation means generates, as the second heat map, a heat map in which a maximum value of the 2D normal distribution is present in a rectangular area surrounding an area indicated by a correct answer label for semantic segmentation using the neural network, and values outside the area indicated by the correct answer label are set to zero.

(Supplementary Note 13)

An information processing system comprising:

a forward propagation apparatus for a neural network; and a learning apparatus for the forward propagation apparatus, wherein the forward propagation apparatus comprises:

mask generation means for generating a binary mask; and layer execution means for performing an operation for a sparse convolutional layer according to a value at each coordinate of the binary mask, the mask generation means:

generates first heat maps by performing an operation for a convolutional layer on an input feature map, the number of the first heat maps being equal to the number of types of objects to be detected by the neural network;

generates a composite heat map obtained by combining the first heat maps, the number of which is equal to the number of types of objects to be detected, into one heat map by summing up values of the first heat maps, the number of which is equal to the number of types of objects to be detected, on a coordinate-by-coordinate basis; and generates the binary mask by binarizing a value at each coordinate of the composite heat map by using a predetermined threshold, and the learning apparatus comprises:

first heat map acquisition means for acquiring the first heat maps generated by the forward propagation apparatus, the number of the first heat maps being equal to the number of types of objects to be detected by the neural network;

second heat map acquisition means for acquiring second heat maps generated based on correct answer labels of the objects to be detected, the number of the second heat maps being equal to the number of the types of objects to be detected;

loss calculation means for calculating a difference between the first heat maps and the second heat maps; and update means for updating a weighting value of the convolutional layer for generating the first heat maps in the forward propagation apparatus based on the calculated difference.

(Supplementary Note 14)

The information processing system described in Supplementary note 13, wherein the learning apparatus further comprises correct heat map generation means for generating a heat map as the second heat map by arranging a 2D normal distribution so as to correspond to position of coordinate specified by the correct answer labels.

(Supplementary Note 15)

A processing method for a forward propagation apparatus for a neural network, comprising:

generating a binary mask, and performing an operation for a sparse convolutional layer according to a value at each coordinate of the binary mask, wherein the generating the binary mask comprises:

generating heat maps by performing an operation for a convolutional layer on an input feature map, the number of the heat maps being equal to the number of types of objects to be detected by the neural network;

generating a composite heat map obtained by combining the heat maps the number of which is equal to the number of types of objects to be detected, into one heat map by summing up values of heat maps on a coordinate-by-coordinate basis; and generating the binary mask by binarizing a value at each coordinate of the composite heat map by using a predetermined threshold.

(Supplementary Note 16)

A non-transitory computer readable medium storing a program for causing a computer of a forward propagation apparatus for a neural network to perform:

a mask generation step of generating a binary mask; and a layer execution step of performing an operation for a sparse convolutional layer according to a value at each coordinate of the binary mask, wherein the mask generation step comprises:

generating heat maps by performing an operation for a convolutional layer on an input feature map, the number of the heat maps being equal to the number of types of objects to be detected by the neural network;

generating a composite heat map obtained by combining the heat maps the number of which is equal to the number of types of objects to be detected, into one heat map by summing up values of heat maps on a coordinate-by-coordinate basis; and generating the binary mask by binarizing a value at each coordinate of the composite heat map by using a predetermined threshold.

REFERENCE SIGNS LIST

1 INFORMATION PROCESSING SYSTEM
2 FORWARD PROPAGATION APPARATUS
3 LEARNING APPARATUS
4 MASK GENERATION UNIT
5 LAYER EXECUTION UNIT
6 FIRST HEAT MAP ACQUISITION UNIT
7 SECOND HEAT MAP ACQUISITION UNIT
8 LOSS CALCULATION UNIT
9 UPDATE UNIT
91 INPUT IMAGE
92 OUTPUT RESULT
93 MODEL STRUCTURE
94 DATA SET
100 FORWARD PROPAGATION APPARATUS
101 BINARY MASK GENERATION UNIT
102 LAYER EXECUTION UNIT
110 MASK UNIT
111 CONVOLUTIONAL LAYER EXECUTION UNIT
112 SUMMING-UP UNIT
113 RESOLUTION ADJUSTMENT UNIT
114 BINARIZATION UNIT
115 EXTENDED-MASK GENERATION UNIT
120 SPARSE CONVOLUTIONAL LAYER
200 LEARNING APPARATUS
201 INITIALIZATION UNIT
202 PREPROCESSING UNIT
203 FORWARD PROPAGATION UNIT
204 LOSS CALCULATION UNIT
205 HEAT MAP GENERATION UNIT
206 MASK LOSS CALCULATION UNIT
207 PARAMETER UPDATE UNIT
208 LEARNING END DETERMINATION UNIT
301 INPUT/OUTPUT INTERFACE
302 MEMORY
303 PROCESSOR

What is claimed is:

1. A forward propagation apparatus for a neural network, comprising:

at least one memory storing instructions; and at least one processor configured to execute the instructions to:

generate heat maps by performing an operation for a convolutional layer on an input feature map, the number of the heat maps being equal to the number of types of objects to be detected by the neural network;

generate a composite heat map obtained by combining the heat maps, the number of which is equal to the number of types of objects to be detected, into one heat map by summing up values of the heat maps on a coordinate-by-coordinate basis;

generate a binary mask by binarizing a value at each coordinate of the composite heat map using a predetermined threshold, wherein the binary mask indicates areas of the composite heat map where the objects to be detected are present; and perform an operation for a sparse convolutional layer according to a value at each coordinate of the binary mask, wherein the operation for the sparse convolutional layer comprises performing product-sum operations only on the areas of the composite heat map where the objects to be detected are present.

2. The forward propagation apparatus according to claim 1, wherein a value of a weight of the convolutional layer for generating heat maps the number of which is equal to the number of types of objects to be detected, is a value that is machine-learned by using a heat map generated based on a correct answer label.

3. The forward propagation apparatus according to claim 1, wherein the at least one processor is further configured to execute the instructions to change a resolution of the composite heat map according to a resolution of the sparse convolutional layer.

4. The forward propagation apparatus according to claim 1, wherein the at least one processor is further configured to execute the instructions to generate the binary mask for an operation for a final layer of consecutive sparse convolutional layers, and further generate a binary mask for an operation for a sparse convolutional layer preceding the final layer from the generated binary mask.

5. The forward propagation apparatus according to claim 1, wherein the number of types of objects to be detected is the number of types of joint points of a human being coordinates of which are detected by the neural network.

6. The forward propagation apparatus according to claim 1, wherein the number of types of objects to be detected is the number of classes used in object detection by the neural network.

7. The forward propagation apparatus according to claim 1, wherein the number of types of objects to be detected is the number of classes used in semantic segmentation by the neural network.

8. A processing method for a forward propagation apparatus for a neural network, comprising:

generating a binary mask, and performing an operation for a sparse convolutional layer according to a value at each coordinate of the binary mask, wherein the generating the binary mask comprises:

generating heat maps by performing an operation for a convolutional layer on an input feature map, the number of the heat maps being equal to the number of types of objects to be detected by the neural network;

generating a composite heat map obtained by combining the heat maps, the number of which is equal to the number of types of objects to be detected, into one heat map by summing up values of the heat maps on a coordinate-by-coordinate basis; and generating the binary mask by binarizing a value at each coordinate of the composite heat map by using a predetermined threshold, wherein the binary mask indicates areas of the composite heat map where the objects to be detected are present, and wherein the operation for the sparse convolutional layer comprises performing product-sum operations only on the areas of the composite heat map where the objects to be detected are present.

\* \* \* \* \*